US011447588B2

(12) United States Patent
Bouzid et al.

(10) Patent No.: US 11,447,588 B2
(45) Date of Patent: Sep. 20, 2022

(54) WATER-SOLUBLE COPOLYMER AND USE THEREOF AS DISPERSANT FOR SUSPENSION OF PARTICLES

(71) Applicant: COATEX, Genay (FR)

(72) Inventors: Mehdi Bouzid, Sainte Foy les Lyon (FR); Clementine Champagne, Caluire-et-cuire (FR); Benoit Magny, Cailloux sur Fontaine (FR); Jean-Marc Suau, Lucenay (FR)

(73) Assignee: COATEX, Genay (FR)

( * ) Notice: Subject to any disclaimer, the term of this patent is extended or adjusted under 35 U.S.C. 154(b) by 231 days.

(21) Appl. No.: 16/088,225

(22) PCT Filed: Mar. 29, 2017

(86) PCT No.: PCT/FR2017/050718
§ 371 (c)(1),
(2) Date: Sep. 25, 2018

(87) PCT Pub. No.: WO2017/174899
PCT Pub. Date: Oct. 12, 2017

(65) Prior Publication Data
US 2020/0291152 A1 Sep. 17, 2020

Related U.S. Application Data

(60) Provisional application No. 62/318,907, filed on Apr. 6, 2016.

(30) Foreign Application Priority Data

Apr. 27, 2016 (FR) ...................................... 1653718

(51) Int. Cl.
C08F 220/06 (2006.01)
C08F 220/20 (2006.01)
C09D 133/02 (2006.01)
C09D 133/08 (2006.01)
C08K 3/22 (2006.01)
C09D 5/02 (2006.01)
C08F 220/28 (2006.01)
C09D 133/10 (2006.01)
C09D 133/06 (2006.01)

(52) U.S. Cl.
CPC .......... C08F 220/06 (2013.01); C08F 220/20 (2013.01); C08F 220/285 (2020.02); C08F 220/286 (2020.02); C08K 3/22 (2013.01); C09D 5/028 (2013.01); C09D 133/02 (2013.01); *C08K 2003/2241* (2013.01); *C09D 133/06* (2013.01); *C09D 133/08* (2013.01); *C09D 133/10* (2013.01)

(58) Field of Classification Search
CPC .... C08F 220/06; C08F 220/04; C08F 220/18; C08F 220/20; C08F 220/285; C08F 220/286
See application file for complete search history.

(56) References Cited

U.S. PATENT DOCUMENTS

| 4,029,577 A * | 6/1977 | Godlewski ................ C02F 5/10 210/701 |
| 4,102,843 A * | 7/1978 | Sperry ................ C09D 133/02 524/219 |
| 4,324,684 A * | 4/1982 | Geiger .................... C23F 11/08 106/14.11 |
| 4,435,556 A * | 3/1984 | Masler, III ................ C02F 5/10 210/701 |
| 4,913,822 A * | 4/1990 | Chen ........................ C02F 5/10 210/699 |
| 5,077,361 A * | 12/1991 | Hughes .................... C08F 20/04 526/233 |
| 5,158,622 A * | 10/1992 | Reichgott ............... C23C 22/34 148/247 |
| 10,000,597 B2 * | 6/2018 | Cheucle ..................... C08F 2/32 |
| 10,118,979 B2 * | 11/2018 | Shimizu ................ C08F 220/04 |

FOREIGN PATENT DOCUMENTS

| CN | 101884888 A | 11/2010 | |
| EP | 0 405 818 A2 | 1/1991 | |
| WO | WO 2016/020599 A1 * | 2/2016 | ............ C08F 220/02 |
| WO | WO 2016/043248 A1 * | 3/2016 | ............ C08F 220/26 |

OTHER PUBLICATIONS

International Search Report dated Jun. 6, 2017 in PCT/FR2017/050718, 3 pages.
Shioji, Naotake, et al., "Copolymers for Corrosion Inhibitors" Database CA [Online] Chemical Abstracts Service, Columbus, Ohio, US, Retrieved from STN Database Accession No. 1988:79880, XP002760023, Sep. 19, 1987, 1 page (Submitting Abstract only).

\* cited by examiner

Primary Examiner — Rip A Lee
(74) Attorney, Agent, or Firm — Oblon, McClelland, Maier & Neustadt, L.L.P.

(57) ABSTRACT

The invention relates to the field of preparing aqueous dispersions of organic, organometallic or inorganic particles. In particular, the invention relates to the preparation of aqueous suspensions comprising organic, organometallic or inorganic particles and at least one particular copolymer obtained by polymerization of at least one acid and at least one compound or at least one ester derived from a particular acid, in the presence of water, at least one initiator compound and at least one activator compound, followed by total or partial neutralization by means of at least one compound chosen from alkali metal hydroxides, alkaline earth metal hydroxides, alkaline earth metal dihydroxides and mixtures thereof. The invention relates to such a particular copolymer having a low polydispersity index and weight-average molecular weight, the preparation process thereof and the use thereof, especially for the preparation of an aqueous paint composition.

29 Claims, No Drawings

WATER-SOLUBLE COPOLYMER AND USE THEREOF AS DISPERSANT FOR SUSPENSION OF PARTICLES

The invention relates to the field of the preparation of aqueous dispersions of organic, organometallic or inorganic particles. In particular, the invention relates to the preparation of aqueous slurries comprising organic, organometallic or inorganic particles and at least one specific copolymer obtained by polymerization of at least one acid and of at least one compound or of at least one ester which are derived from a specific acid, in the presence of water, of at least one initiating compound and of at least one activating compound, followed by the complete or partial neutralization by means of at least one compound chosen from alkali metal hydroxides, alkaline earth metal hydroxides, alkaline earth metal dihydroxides and their mixtures. The invention relates to such a specific copolymer having low polydispersity indices ($I_p$) and weight-average molecular weight ($M_W$), to its process of preparation and to its use, in particular in the preparation of a water-based paint composition.

Water-soluble copolymers of use as dispersing agent during the preparation of slurries of particles are known. In particular, dispersing agents for the preparation of gloss paint compositions comprising dispersed titanium dioxide particles are known.

For such paint compositions, qualities of gloss of the coating obtained after application are generally desired. Very good optical properties as well as very good mechanical properties are also desired.

Processes for the preparation of acrylic acid and ester copolymers which employ sodium thiosulfate are known; for example, CN 101884888 discloses such grinding agents. JP 1986-53627 discloses the corrosion-inhibiting properties of a copolymer comprising sulfonic groups. EP 2 657 261 describes an acrylic acid homopolymer.

Known copolymers prepared by means of sulfites have to be prepared in a highly diluted manner, for example, at a solids content of 7% to 12% by weight, in order to prevent the formation of an insoluble precipitate during the neutralization thereof with sodium hydroxide or with potassium hydroxide. Neutralization with ammonia then constitutes the only alternative, despite the inconveniences which result therefrom.

Generally, the dispersing agents of the state of the art are prepared by processes comprising a stage of neutralization by means of ammonia, thus improving the dispersing properties of the copolymer obtained. The choice of this specific neutralization agent can also influence the optical properties of the paint coating subsequently produced. It can also influence the mechanical properties of this coating.

For example, U.S. Pat. No. 3,859,260 describes a redox radical polymerization reaction which employs an initiating compound and a large amount of bisulfite as reducing agent. The polymer is neutralized with potassium hydroxide or with ammonia.

U.S. Pat. No. 4,102,843 describes an aqueous emulsion paint composition comprising an alkyl acrylate and acrylic acid copolymer as dispersing agent. This copolymer is obtained by polymerization in isopropanol and of an initiating compound and then it is neutralized by means of sodium hydroxide.

However, during the implementation of known processes, the residual presence of more or less large amounts of ammonia can cause problems of odor, of health or of industrial hygiene.

Moreover, the presence of volatile organic compounds (VOCs), such as ammonia, in paint compositions is also problematic.

Thus, apart from the properties of good dispersion of the particles and of improved optical properties, the dispersing agents also have to make it possible to prevent or reduce the presence of volatile organic compounds. In particular, such dispersing agents should not result in the release of ammonia.

One solution to this problem could consists in employing neutralization agents while avoiding the presence of ammonia. However, the use of alkali metal cations generally results in a deterioration in the dispersing properties or optical properties desired. In particular, some sulfonated polymers obtained by a polymerization reaction catalyzed by peroxide and bisulfite prove to be difficult or impossible to neutralize by means of alkali metal derivatives as a result of the risk of precipitation in the prepared compositions of salts of these alkali metals, in particular alkali metal sulfates.

It is also necessary to have available preparation methods during which the solids concentration of the reaction medium has to be high while making it possible to avoid the use of ammonia during the neutralization of the polymers prepared. Concentrations of greater than 20% by weight or else of greater than 30% or greater than 40% or 45% by weight are particularly preferred.

Furthermore, the dispersing agents used during the preparation of slurries of particles, and in particular of slurries of particles for the preparation of paint compositions, have to make it possible to maintain or improve the abrasion resistance or to improve the wet abrasion resistance.

These dispersing agents also have to maintain or improve the shelf life as well as the flow and the leveling. The maintenance or the improvement in the hiding power should also be desired. Pigment compatibility and blocking resistance, in other words the resistance to the adhesion of two coating layers brought into contact, are also properties desired for the coatings prepared. For these coatings, an improvement in the resistance to stains is also desired.

An important property also resides in the stability of the paint compositions during their storage in containers.

The dispersing agents for particles also have to have satisfactory or improved intrinsic properties, in particular a low viscosity. They should also be widely compatible with different types of particles or with different types of materials or of additives. They should thus be very versatile.

Furthermore, the copolymers of use as dispersants, in particular as dispersants of acrylic type for a water-based paint composition, have to be able to be prepared in high concentrations which are advantageous commercially, in particular in concentrations of greater than 35% by weight of neutralized copolymer of the solution.

There thus exists a need for a person skilled in the art to have available dispersing agents for particles having improved properties.

The invention makes it possible to provide a solution to all or some of the problems encountered with the dispersing agents of the state of the art.

Thus, the invention provides a copolymer obtained according to a process comprising:
  at least one polymerization reaction:
    (a) of at least one acid chosen from acrylic acid, methacrylic acid and their mixtures; and
    (b) of at least one compound or of at least one ester of a compound which are derived from an acid chosen from acrylic acid, methacrylic acid, itaconic acid and maleic acid;

in the presence of water, of at least one initiating compound chosen from hydrogen peroxide, sodium persulfate, potassium persulfate, ammonium persulfate and their mixtures and of at least one activating compound chosen from alkali metal hypophosphites, in particular sodium hypophosphite, potassium hypophosphite, and their mixtures, and preferably in the absence of sodium thiosulfate;

the complete or partial neutralization by means of at least one compound chosen from MgO, CaO, alkali metal hydroxides, alkaline earth metal hydroxides, alkaline earth metal dihydroxides and their mixtures.

Advantageously, the invention provides a copolymer, the intrinsic characteristics of which can be controlled. Preferably according to the invention, the copolymer obtained has a weight-average molecular weight ($M_w$) ranging from 1000 to 6000 g/mol, preferably from 1500 to 4000 g/mol. Also preferably according to the invention, the copolymer obtained has a polydispersity index ($I_p$) ranging from 1.5 to 3, preferably from 1.8 to 2.3.

According to the invention, the neutralization is carried out after the polymerization reaction. The invention thus also provides an alkali metal salt or an alkaline earth metal salt of a copolymer obtained according to the invention or else a mixture of such a salt and of a copolymer obtained according to the invention.

Preferably according to the invention, the polymerization reaction employs an acid (a) chosen from acrylic acid, methacrylic acid and their mixtures. Acrylic acid is preferred. Apart from acrylic acid and methacrylic acid, the polymerization reaction can employ at least one other acid (a). Preferably, the polymerization reaction then also employs another acid (a) chosen from acrylic acid, methacrylic acid, itaconic acid and maleic acid. Advantageously, the polymerization reaction can employ acrylic acid with itaconic acid or with maleic acid or else methacrylic acid with itaconic acid or with maleic acid.

Also preferably according to the invention, the polymerization reaction employs from 10% to 90%, preferably from 30% to 60%, by weight of compound (a), with respect to the total amount by weight of compounds (a) and (b).

Preferably according to the invention, the polymerization reaction employs at least one compound (b) which is a compound of formula (A):

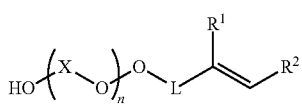

(A)

in which:
X, which is identical or different, independently represents a linear or branched $C_1$-$C_{10}$-alkylene group;
n represents a whole or decimal number ranging from 1 to 5;
Q represents a group chosen from C(O), $CH_2$, $CH_2$—O and $(CH_2)_4$—O;
L represents a direct bond or a $CH_2$ group;
$R^1$ represents H, $CH_3$ or C(O)OH;
$R^2$ represents H or C(O)OH.

Also preferably according to the invention, the polymerization reaction employs at least one compound (b) of formula (I), (II), (III) or (IV):

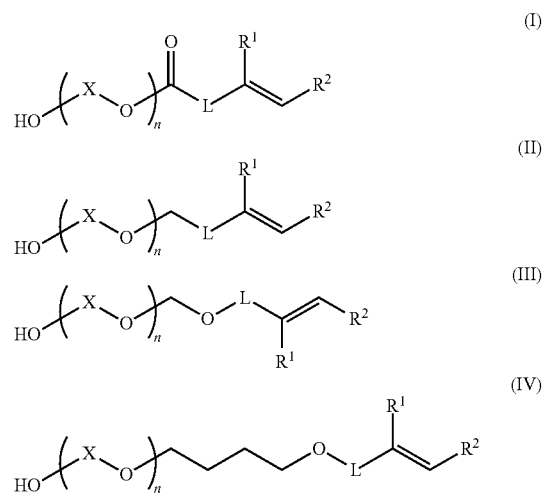

in which:
X, which is identical or different, independently represents a linear or branched $C_1$-$C_{10}$-alkylene group;
n represents a whole or decimal number ranging from 1 to 5;
L represents a direct bond or a $CH_2$ group;
$R^1$ represents H, $CH_3$ or C(O)OH;
$R^2$ represents H or C(O)OH.

More preferably, the compound (b) is a compound of formula (A), (I), (II), (III) or (IV) in which X, which is identical or different, independently represents a linear or branched $C_2$-$C_4$-alkylene group, in particular an ethylene group, a propylene group or a butylene group.

More preferably still, the compound (b) is a compound of formula (A), (I), (II), (III) or (IV) in which:
L represents a direct bond, $R^1$ represents H and $R^2$ represents H; or
L represents a direct bond $CH_2$, $R^1$ represents $CH_3$ and $R^2$ represents H; or
L represents a direct bond, $R_1$ represents H and $R^2$ represents C(O)OH; or
L represents a $CH_2$ group, $R^1$ represents C(O)OH and $R^2$ represents H.

Much more preferably, the compound (b) is a compound of formula (A), (I), (II), (III) or (IV) in which n represents 1 and:
L represents a direct bond, $R^1$ represents H and $R^2$ represents H; or
L represents a direct bond $CH_2$, $R^1$ represents $CH_3$ and $R^2$ represents H; or
L represents a direct bond, $R^1$ represents H and $R^2$ represents C(O)OH; or
L represents a $CH_2$ group, $R^1$ represents C(O)OH and $R^2$ represents H;

in particular a compound of formula (A), (I), (II), (III) or (IV) in which n represents 1 and:
L represents a direct bond, $R^1$ represents H and $R^2$ represents H; or
L represents a direct bond $CH_2$, $R^1$ represents $CH_3$ and $R^2$ represents H.

Particularly preferably according to the invention, the polymerization reaction employs a compound (b) chosen from hydroxyethyleneoxy acrylate, hydroxypropyleneoxy acrylate, hydroxyethyleneoxy methacrylate or hydroxypropyleneoxy methacrylate. Hydroxypropyleneoxy acrylate or 2-hydroxypropylacrylate (CAS 999-61-1) is preferred. Also preferably according to the invention, the polymerization reaction employs from 10% to 90%, preferably from 40% to 70%, by weight of compound (b), with respect to the total amount by weight of compounds (a) and (b).

According to the invention, the polymerization reaction is carried out in the presence of water, of at least one initiating compound and of at least one activating compound. The preferred initiating compound is hydrogen peroxide ($H_2O_2$), which can be combined with metal salts, in particular iron salts, copper salts or their mixtures. The preferred activating compound is sodium hypophosphite ($NaPO_2H_2$). Preferably according to the invention, the polymerization reaction employs from 5% to 15% by weight, preferably from 7% to 11% by weight, of alkali metal hypophosphites, with respect to the total amount by weight of monomers.

Preferably according to the invention, the complete or partial neutralization is carried out by means of at least one compound chosen from NaOH, KOH, MgO, CaO, $Mg(OH)_2$, $Ca(OH)_2$ and their mixtures. Advantageously, the partial neutralization is carried out by means of NaOH, KOH, MgO, CaO, $Mg(OH)_2$, $Ca(OH)_2$ and their mixtures and the complete neutralization is carried out by means of NaOH, KOH and their mixtures. Particularly preferably according to the invention, the complete or partial neutralization is carried out by means of potassium hydroxide or sodium hydroxide and in particular by means of potassium hydroxide.

Advantageously according to the invention, the initiating compound can be chosen from hydrogen peroxide, sodium persulfate, potassium persulfate, ammonium persulfate and their mixtures and the neutralization can be carried out by means of potassium hydroxide.

Apart from a specific copolymer, the invention also relates to a process for the preparation of this copolymer. The process according to the invention comprises:
  at least one polymerization reaction:
    (a) of at least one acid chosen from acrylic acid, methacrylic acid and their mixtures; and
    (b) of at least one compound or of at least one ester of a compound which are derived from an acid chosen from acrylic acid, methacrylic acid, itaconic acid and maleic acid;
    in the presence of water, of at least one initiating compound chosen from hydrogen peroxide, sodium persulfate, potassium persulfate, ammonium persulfate and their mixtures and of at least one activating compound chosen from alkali metal hypophosphites, in particular sodium hypophosphite, potassium hypophosphite, and their mixtures, and preferably in the absence of sodium thiosulfate;
  the complete or partial neutralization by means of at least one compound chosen from MgO, CaO, alkali metal hydroxides, alkaline earth metal hydroxides, alkaline earth metal dihydroxides and their mixtures.

For the process according to the invention, the polymerization reaction can be repeated. The neutralization is then carried out after the polymerization reaction. The invention thus also provides a process for the preparation of an alkali metal salt or of an alkaline earth metal salt of a copolymer obtained according to the process of the invention or else a mixture of such a salt and of a copolymer obtained according to the process of the invention.

A preferred process according to the invention employs an acid (a) chosen from acrylic acid, methacrylic acid and their mixtures. Acrylic acid is preferred. Apart from acrylic acid and methacrylic acid, the polymerization reaction can employ at least one other acid (a). Preferably, the polymerization reaction then also employs another acid (a) chosen from acrylic acid, methacrylic acid, itaconic acid and maleic acid. Advantageously, the polymerization reaction can employ acrylic acid with itaconic acid or with maleic acid or else methacrylic acid with itaconic acid or with maleic acid.

A process which is also preferred according to the invention employs from 10% to 90%, preferably from 30% to 60%, by weight of compound (a), with respect to the total amount by weight of compounds (a) and (b).

A preferred process according to the invention employs at least one compound (b) which is a compound of formula (A):

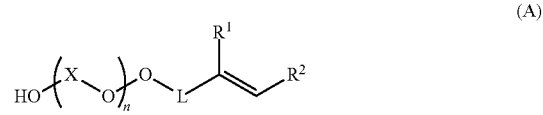

(A)

in which:
X, which is identical or different, independently represents a linear or branched $C_1$-$C_{10}$-alkylene group;
n represents a whole or decimal number ranging from 1 to 5;
Q represents a group chosen from C(O), $CH_2$, $CH_2$—O and $(CH_2)_4$—O;
L represents a direct bond or a $CH_2$ group;
$R^1$ represents H, $CH_3$ or C(O)OH;
$R^2$ represents H or C(O)OH.

A process which is also preferred according to the invention employs at least one compound (b) which is a compound of formula (I), (II), (III) or (IV):

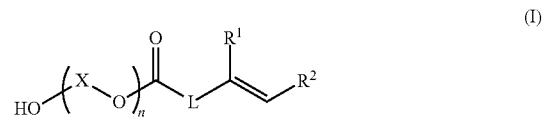

(I)

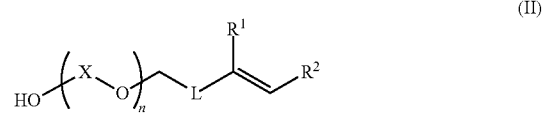

(II)

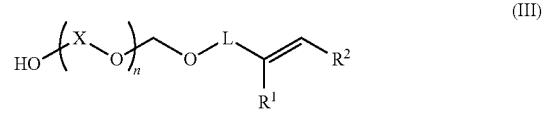

(III)

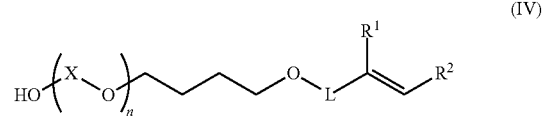

(IV)

in which:
X, which is identical or different, independently represents a linear or branched $C_1$-$C_{10}$-alkylene group;
n represents a whole or decimal number ranging from 1 to 5;
L represents a direct bond or a $CH_2$ group;
$R^1$ represents H, $CH_3$ or C(O)OH;
$R^2$ represents H or C(O)OH.

More preferably for the process according to the invention, the compound (b) is a compound of formula (A), (I), (II), (III) or (IV) in which X, which is identical or different, independently represents a linear or branched $C_2$-$C_4$-alkylene group, in particular an ethylene group, a propylene group or a butylene group. More preferably still, the compound (b) is a compound of formula (A), (I), (II), (III) or (IV) in which:

L represents a direct bond, $R^1$ represents H and $R^2$ represents H; or

L represents a direct bond, $R^1$ represents $CH_3$ and $R^2$ represents H; or

L represents a direct bond, $R^1$ represents H and $R^2$ represents C(O)OH; or

L represents a $CH_2$ group, $R^1$ represents C(O)OH and $R^2$ represents H.

Much more preferably, the compound (b) is a compound of formula (A), (I), (II), (III) or (IV) in which n represents 1 and:

L represents a direct bond, $R^1$ represents H and $R^2$ represents H; or

L represents a direct bond, $R^1$ represents $CH_3$ and $R^2$ represents H; or

L represents a direct bond, $R^1$ represents H and $R^2$ represents C(O)OH; or

L represents a $CH_2$ group, $R^1$ represents C(O)OH and $R^2$ represents H;

in particular a compound of formula (A), (I), (II), (III) or (IV) in which n represents 1 and:

L represents a direct bond, $R^1$ represents H and $R^2$ represents H; or

L represents a direct bond, $R^1$ represents $CH_3$ and $R^2$ represents H.

Particularly preferably according to the invention, the polymerization reaction employs a compound (b) chosen from hydroxyethyleneoxy acrylate, hydroxypropyleneoxy acrylate, hydroxyethyleneoxy methacrylate or hydroxypropyleneoxy methacrylate. Hydroxypropyleneoxy acrylate is preferred.

A process which is also preferred according to the invention employs from 10% to 90%, preferably from 40% to 70%, by weight of compound (b), with respect to the total amount by weight of compounds (a) and (b).

For the process according to the invention, the polymerization reaction is carried out in the presence of water, of at least one initiating compound and of at least one activating compound. The preferred initiating compound is hydrogen peroxide ($H_2O_2$), which can be combined with metal salts, in particular iron salts, copper salts or their mixtures. The preferred activating compound is sodium hypophosphite ($NaPO_2H_2$). Preferably according to the invention, the polymerization reaction employs from 5% to 15% by weight, preferably from 7% to 11% by weight, of alkali metal hypophosphites, with respect to the total amount by weight of monomers.

Apart from a specific copolymer and a process for the preparation of this copolymer, the invention also relates to the use of this copolymer.

Preferably, the invention relates to the use of at least one copolymer according to the invention in the preparation of an aqueous dispersion, in particular in the preparation of an aqueous dispersion of organic, organometallic or inorganic particles.

The invention thus provides a specific aqueous dispersion comprising at least one copolymer according to the invention and organic, organometallic or inorganic particles dispersed in an aqueous medium, preferably dispersed in water.

Preferably, the particles employed according to the invention are particles of at least one pigment. Also preferably, the particles employed according to the invention are inorganic particles. Particularly preferably, they are $TiO_2$ particles.

Among aqueous dispersions, the invention preferably provides an aqueous slurry comprising organic, organometallic or inorganic particles and at least one copolymer according to the invention within an aqueous substrate, preferably in water.

The copolymer according to the invention, the aqueous dispersion according to the invention or the aqueous slurry according to the invention can be used in the preparation of numerous compositions. Preferably, the copolymer according to the invention, the aqueous dispersion according to the invention or the aqueous slurry according to the invention are used in the preparation of an aqueous adhesive composition or of an aqueous coating composition, in particular of a thick-layer coating or of a thin-layer coating.

Particularly preferably according to the invention, the aqueous coating composition is an aqueous varnish composition or paint composition, for example a decorative paint or industrial paint composition.

Thus, preferably, the invention also provides a water-based paint composition comprising, in an aqueous substrate, preferably in water, at least one film-forming copolymer latex;

at least one organic or inorganic pigment;

at least one copolymer according to the invention.

The specific, advantageous or preferred characteristics of the copolymer according to the invention make it possible to define specific, advantageous or preferred aqueous dispersions according to the invention, specific, advantageous or preferred aqueous slurries according to the invention and specific, advantageous or preferred compositions according to the invention.

The examples which follow make it possible to illustrate the different aspects of the invention.

EXAMPLE 1

Process (1) for the Preparation of Copolymers According to the Invention

The following are weighed into a 1000 ml glass reactor equipped with a mechanical stirring system and with a heating system of oil bath type:

310 grams of water, 0.134 g of iron sulfate heptahydrate, 0.02 g of copper sulfate pentahydrate.

The combined mixture is then heated to 95° C.±2° C. and the following reactants are then added using three peristaltic pumps with continuous additions over two hours at 95° C.:

Pump 1: the monomers:

acrylic acid: 284.04 g 2-hydroxypropyleneoxy acrylate: 180 g water: 31.6 g

Pump 2: the initiating compound:

130-volume aqueous hydrogen peroxide solution: 37 g water: 45 g

Pump 3: the reducing activating compound:

50% sodium hypophosphite solution: 96 g.

After rinsing the pumps, the combined mixture is subsequently heated at 95° C. for 45 min.

A polymer is obtained which is then analyzed:
residual monomers: acrylic acid=30 ppm and 2-hydroxypropyl acrylate<60 ppm,
$M_W$=2795 g/mol,
$I_p$=2.
This polymer is subsequently neutralized at pH=8±0.5 in two forms and for a solids content of 45%±0.5%:
neutralization with sodium hydroxide in order to obtain the copolymer 1-1,
neutralization with potassium hydroxide in order to obtain the copolymer 1-2.

EXAMPLE 2

Process (2) for the Preparation of Comparative Copolymers

The following are weighed into a 1000 ml glass reactor equipped with a mechanical stirring system and with a heating system of oil bath type:
310 grams of water,
0.134 g of iron sulfate heptahydrate,
0.02 g of copper sulfate pentahydrate.
The combined mixture is then heated to 95° C.±2° C. and the following reactants are then added using three peristaltic pumps with continuous additions over two hours at 95° C.:
Pump 1: the monomers:
  acrylic acid: 284.04 g
  2-hydroxypropyleneoxy acrylate: 180 g
  water: 31.6 g
Pump 2: the initiating compound:
  130-volume aqueous hydrogen peroxide solution: 37 g
  water: 45 g
Pump 3: the reducing activating compound:
  50% sodium hypophosphite solution: 96 g.
After rinsing the pumps, the combined mixture is subsequently heated at 95° C. for 45 min. A polymer is obtained which is then analyzed:
residual monomers: acrylic acid=30 ppm and 2-hydroxypropyl acrylate<60 ppm,
$M_W$=2755 g/mol,
$I_p$=3.
This polymer is subsequently neutralized at pH=8±0.5 and for a solids content of 45%±0.5% by neutralization with ammonia in order to obtain the copolymer 2-1.

EXAMPLE 3

Process (3) for the Preparation of Comparative Copolymers

The following are weighed into a 1000 ml glass reactor equipped with a mechanical stirring system and with a heating system of oil bath type:
180 grams of water,
0.003 g of iron sulfate heptahydrate.
The combined mixture is then heated to 73° C.±2° C. and the following reactants are then added using three peristaltic pumps with continuous additions over two hours at 73° C.:
Pump 1: the monomers:
  acrylic acid: 245 g
  2-hydroxypropyleneoxy acrylate: 159.89 g
  water: 60 g
Pump 2: the initiating compound:
  ammonium persulfate: 5.88 g
  water: 60 g
Pump 3: the reducing activating compound:
  40% sodium bisulfite solution: 142 g.
The monomers and the reducing compound are added over 3 h 30 min; the initiating compound is added over 3 h 35 min. After rinsing the pumps, the combined mixture is subsequently heated at 73° C. for 60 min. A polymer is obtained which is then analyzed:
residual monomers: acrylic acid=60 ppm and 2-hydroxypropyl acrylate<60 ppm,
$M_W$=3115 g/mol,
$I_p$=2.4.
This polymer is subsequently neutralized at pH=8±0.5 in two forms and for a solids content of 45%±0.5%:
neutralization with sodium hydroxide in order to obtain the copolymer 3-1,
neutralization with potassium hydroxide in order to obtain the copolymer 3-2.

EXAMPLE 4

Process (4) for the Preparation of Comparative Copolymers

The following are weighed into a 1000 ml glass reactor equipped with a mechanical stirring system and with a heating system of oil bath type:
180 grams of water,
0.003 g of iron sulfate heptahydrate.
The combined mixture is then heated to 73° C.±2° C. and the following reactants are then added using three peristaltic pumps with continuous additions over two hours at 73° C.:
Pump 1: the monomers:
  acrylic acid: 245 g
  2-hydroxypropyleneoxy acrylate: 159.89 g
  water: 60 g
Pump 2: the initiating compound:
  ammonium persulfate: 5.88 g
  water: 60 g
Pump 3: the reducing activating compound:
  40% sodium bisulfite solution: 142 g.
The monomers and the reducing compound are added over 3 h 30 min; the initiating compound is added over 3 h 35 min. After rinsing the pumps, the combined mixture is subsequently heated at 73° C. for 60 min. A polymer is obtained which is then analyzed:
residual monomers: acrylic acid=60 ppm and 2-hydroxypropyl acrylate<60 ppm,
$M_W$=2640 g/mol,
$I_p$=2.1.
This polymer is subsequently neutralized at pH=8±0.5 and for a solids content of 45%±0.5% by neutralization with ammonia in order to obtain the copolymer 4-1.

The molecular weights of the copolymers are determined by size exclusion chromatography (SEC) or gel permeation chromatography (GPC). This technique employs a Waters brand liquid chromatography device provided with a detector. This detector is a Waters brand refractometric concentration detector. This liquid chromatography equipment has a size exclusion column in order to separate the different molecular weights of the copolymers studied. The liquid elution phase is an aqueous phase adjusted to pH 9.00 using 1N sodium hydroxide containing 0.05M of $NaHCO_3$, 0.1M of $NaNO_3$, 0.02M of triethanolamine and 0.03% of $NaN_3$.

According to a first stage, 0.9% of the copolymer solution on a dry basis is diluted in the dissolution solvent of the SEC, which corresponds to the liquid elution phase of the SEC, to which is added 0.04% of dimethylformamide, which acts as marker of flow rate or internal standard. Filtration is then carried out using a 0.2 μm filter. 100 μl are subsequently injected into the chromatography device (eluent: an aqueous phase adjusted to pH 9.00 with 1N sodium hydroxide containing 0.05M of $NaHCO_3$, 0.1M of $NaNO_3$, 0.02M of triethanolamine and 0.03% of $NaN_3$).

The liquid chromatography device contains an isocratic pump (Waters 515), the flow rate of which is adjusted to 0.8 ml/min. The chromatography device also comprises an oven which itself comprises, in series, the following system of columns: a precolumn of Waters Ultrahydrogel Guard Column type with a length of 6 cm and an internal diameter of 40 mm, and a linear column of Waters Ultrahydrogel type with a length of 30 cm and an internal diameter of 7.8 mm. The detection system is composed of a Waters 410 refractometric detector of RI type. The oven is brought to a temperature of 60° C. and the refractometer is brought to a temperature of 45° C.

The chromatography device is calibrated by means of powdered sodium polyacrylate standards of different molecular weights certified by the supplier: Polymer Standard Service or American Polymer Standards Corporation.

The characteristics of the copolymers prepared are presented in table 1.

TABLE 1

| | Copolymer | | | | | |
|---|---|---|---|---|---|---|
| | According to the invention | | Comparative | | | |
| | 1-1 | 1-2 | 2-1 | 3-1 | 3-2 | 4-1 |
| $M_w$ (g/mol) | 2795 | 2795 | 2755 | 3115 | 3115 | 2640 |
| $I_p$ | 2 | 2 | 3 | 2.4 | 2.4 | 2.1 |
| Specific viscosity | 0.320 | 0.320 | 0.337 | 0.273 | 0.327 | 0.327 |
| Appearance after neutralization | clear | clear | clear | cloudy | phase-separated | clear |

During the implementation of the process (1), solutions which are clear and stable on storage are obtained. During the implementation of the process (2), only the polymer neutralized with ammonia is clear.

Thus, the polymerization according to the invention, which employs an initiating compound of sodium hypophosphite type, makes it possible to obtain copolymers of use as acrylic dispersants, with high and commercially advantageous concentrations (>35%, indeed even than 40% or else than 43%, for example) and with alkali metal cations resulting from the neutralization.

It is not possible to obtain such results when the reducing initiating compound is sodium bisulfite, unless ammonia is used during the neutralization of the copolymer, then resulting in the presence of a release of volatile organic compounds during the use of these polymers.

EXAMPLE 5

Use of the Copolymers in the Preparation of Paint Compositions and Evaluation of the Properties of the Paint Three paint formulations are prepared by mixing the constituents presented in table 2.

TABLE 2

| Composition | | Amount (kg) |
|---|---|---|
| Pasting phase | | |
| Water | | 37.78 |
| Sequestering agent | Potassium tripolyphosphate (KTPP) | 0.45 |
| Dispersing copolymer 1-1, 1-2 or 2-1 | according to the invention or comparative | 2.09 |
| Surface-active agent | Triton CF-10 | 1.36 |
| Antifoaming agent | Rhodaline 640 | 0.45 |
| Fungicide | Karhon LX (1.5%) | 0.68 |
| Sodium carbonate | Aldrich | 1.91 |
| Rutile $TiO_2$ (76.5% by weight) | Kronos 2310/Tronox CR 828/Ti-Pure R 902 | 112.49 |
| Kaolin | Polygloss 90 | 9.07 |
| Water | | 38.28 |
| Remainder | | |
| Latex | Arkema Encor 300 | 158.76 |
| Latex | Arkema Encor 626 | 68.04 |
| Antifoaming agent | Rhodaline 640 | 0.91 |
| Thickening agent | Coatex Rheotech 2800 | 9.84 |
| Thickening agent | Coatex Rheotech 4800 | 0.18 |
| Water | | 44.45 |
| TOTAL | | 486.75 |

The Stormer viscosity (KU) (ASTM D 562), the ICI viscosity (ASTM D 4287) and the Brookfield viscosity (ASTM D 2196) at 10 revolutions/min and 100 revolutions/min at 25° C. were measured for the three paint formulations. The results are presented in table 3.

TABLE 3

| | Dispersing copolymer | | |
|---|---|---|---|
| | 1-1 | 1-2 | 2-1 |
| Stormer (KU) | 112.2 | 117.2 | 113.2 |
| ICI | 0.555 | 0.495 | 0.475 |
| Brookfield 10 rev/min (mPa · s) | 9560 | 14 600 | 10 400 |
| Brookfield 100 rev/min (mPa · s) | 3715 | 4300 | 3660 |

The dispersing properties of the copolymers employed were evaluated by producing deflocculation curves for different grades of $TiO_2$ particles. The effectiveness of the dispersing agent during the suspending in water of titanium dioxide at a specific concentration is thus demonstrated.

An aqueous TiO$_2$ slurry is prepared by introducing 190 g of water into a beaker, by then adding 612 g of rutile TiO$_2$ (Kronos 2310, Tronox CR 828 and DuPont Ti-Pure R 902) and by slowly mixing by means of a mechanical mixer until complete homogenization is achieved. A thick paste is formed, the solids content of which is confirmed by means of a balance when dry. The solids content has to be 76.5±0.5%.

The initial Brookfield viscosity (ASTM D 2196) of the thick paste is measured at 100 rev/min.

A first amount of dispersing agent is then added and mixing is carried out for 5 min in order to obtain a dispersion of the TiO$_2$ particles.

Brookfield viscosity (ASTM D 2196) of the thick paste comprising the dispersing agent is measured at 100 rev/min.

The stages of addition of slightly increasing amounts of dispersing agent, of mixing and of measuring the viscosity are repeated until, at one measurement, a viscosity value which is stabilized or which varies very slightly is obtained. The results for the different rutile TiO$_2$ products Kronos 2310, Tronox CR 828 and DuPont Ti-Pure R 902 are presented in tables 4, 5 and 6.

TABLE 4

| TiO$_2$ Kronos 2310 | Amount of dispersant (g) | % (dry/dry)/ TiO$_2$ | Brookfield viscosity 100 rev/min (mPa · s) |
|---|---|---|---|
| Dispersing copolymer 1-1 | 1 | 0.060 | 19 360 |
| | 1.2 | 0.073 | 14 240 |
| | 1.4 | 0.083 | 11 680 |
| | 1.6 | 0.098 | 3800 |
| | 1.9 | 0.117 | 638 |
| | 2.2 | 0.132 | 208 |
| | 2.5 | 0.148 | 174.4 |
| | 2.9 | 0.176 | 181.4 |
| | 3.5 | 0.212 | 286.2 |
| Dispersing copolymer 1-2 | 1.0 | 0.0637 | 18 920 |
| | 1.4 | 0.0892 | 9150 |
| | 1.7 | 0.1083 | 1260 |
| | 2.0 | 0.1274 | 235 |
| | 2.2 | 0.1401 | 180 |
| | 2.4 | 0.1528 | 162 |
| | 3.4 | 0.2165 | 118 |
| Dispersing copolymer 2-1 | 1.0 | 0.0607 | NA |
| | 1.2 | 0.0728 | 17 920 |
| | 1.5 | 0.0910 | 12 480 |
| | 1.8 | 0.1092 | 5800 |
| | 2.0 | 0.1214 | 1700 |
| | 2.3 | 0.1396 | 392 |
| | 2.6 | 0.1578 | 214.4 |
| | 2.8 | 0.1699 | 185.6 |
| | 3.1 | 0.1881 | 177.6 |
| | 4.4 | 0.2670 | 348.8 |

TABLE 5

| TiO$_2$ Tronox CR 828 | Amount of dispersant (g) | % (dry/dry)/ TiO$_2$ | Brookfield viscosity 100 rev/min (mPa · s) |
|---|---|---|---|
| Dispersing copolymer 1-1 | 1.5 | 0.092 | not measurable |
| | 1.7 | 0.104 | 12 720 |
| | 1.9 | 0.116 | 29 360 |
| | 2.2 | 0.133 | 19 680 |
| | 2.5 | 0.152 | 23 520 |
| | 3.3 | 0.203 | 10 320 |
| | 3.6 | 0.219 | 5230 |
| | 3.9 | 0.238 | 3280 |
| | 4.2 | 0.258 | 1284 |
| | 4.6 | 0.284 | 604 |
| | 4.9 | 0.297 | 548 |
| | 5.3 | 0.324 | 454 |
| | 5.82 | 0.356 | 491 |
| Dispersing copolymer 1-2 | 2.7 | 0.170 | 15 000 |
| | 3.1 | 0.195 | 14 200 |
| | 3.4 | 0.214 | 13 560 |
| | 3.9 | 0.246 | 3180 |
| | 4.2 | 0.265 | 1644 |
| | 4.4 | 0.277 | 1034 |
| | 4.7 | 0.296 | 780 |
| | 4.9 | 0.309 | 592 |
| | 5.1 | 0.321 | 491 |
| | 5.3 | 0.324 | 431 |
| | 6.3 | 0.385 | 374 |
| Dispersing copolymer 2-1 | 1.2 | 0.0731 | 31 880 |
| | 1.4 | 0.0852 | 27 980 |
| | 1.6 | 0.0974 | 27 680 |
| | 1.9 | 0.1157 | 27 400 |
| | 2.1 | 0.128 | 27 760 |
| | 3.3 | 0.201 | 11 040 |
| | 3.5 | 0.213 | 7280 |
| | 3.7 | 0.225 | 3160 |
| | 3.9 | 0.237 | 1246 |
| | 4.3 | 0.262 | 750 |
| | 4.5 | 0.274 | 534 |
| | 4.9 | 0.298 | 466 |
| | 5.10 | 0.311 | 376 |
| | 5.80 | 0.353 | 536 |

TABLE 6

| TiO$_2$ DuPont Ti-Pure R 902 | Amount of dispersant (g) | % (dry/dry)/ TiO$_2$ | Brookfield viscosity 100 rev/min (mPa · s) |
|---|---|---|---|
| Dispersing copolymer 1-1 | 2.06 | 0.126 | 18 320 |
| | 2.3 | 0.143 | 7960 |
| | 2.6 | 0.157 | 2890 |
| | 2.9 | 0.175 | 688 |
| | 3.1 | 0.191 | 408 |
| | 3.4 | 0.208 | 266 |
| | 3.7 | 0.227 | 275 |
| | 4.4 | 0.267 | 216.4 |
| | 4.8 | 0.293 | 229.2 |
| Dispersing copolymer 1-2 | 2.2 | 0.140 | 18 600 |
| | 2.5 | 0.159 | 6560 |
| | 2.8 | 0.178 | 836 |
| | 3.0 | 0.191 | 490 |
| | 3.2 | 0.204 | 286 |
| | 3.4 | 0.216 | 228 |
| | 3.6 | 0.229 | 197 |
| | 4.5 | 0.286 | 152 |
| Dispersing copolymer 2-1 | 1.7 | 0.1060 | 16 800 |
| | 2.1 | 0.1262 | 5880 |
| | 2.3 | 0.1408 | 1900 |
| | 2.5 | 0.1542 | 900 |
| | 2.7 | 0.165 | 480 |
| | 3.0 | 0.180 | 283.6 |
| | 3.3 | 0.201 | 238.8 |
| | 3.6 | 0.220 | 210 |
| | 4.0 | 0.242 | 204.8 |

The different copolymers make possible good dispersion of the TiO$_2$ particles of different grades.

The optical properties of the three paint formulations were also evaluated by measuring their gloss at 20°, at 60° and at 85° by means of a Micro-Tri-Gloss reflectometer from BYK-Gardner (ASTM D3928) and their opacifying properties (ASTM D2805). The measurements were carried out 24 hours after application of the paint.

The flow-sagging compromise of these three formulations was also evaluated (respectively ASTM D4400 and ASTM D4062).

The clearness index or whiteness index of the paint film was also measured by the measurement of the L* component in the Lab (L*a*b*) colorimetric space, using a spectrophotometer (ASTM D2244).

The wet abrasion resistance of these three formulations was also evaluated (ASTM D2486 and ASTM D4213).

The combined results are presented in table 7.

TABLE 7

| | Dispersing copolymer | | |
|---|---|---|---|
| | 1-1 | 1-2 | 2-1 |
| Gloss 20° | 36.5 | 30.4 | 33.3 |
| Gloss 60° | 70.7 | 69.1 | 69.8 |
| Gloss 85° | 93.5 | 91.7 | 94.3 |
| Opacity | 97.37 | 96.98 | 97.38 |
| Color L | 95.4 | 95.38 | 95.25 |
| Color a | −2.59 | −2.58 | −2.57 |
| Color b | 2.34 | 2.43 | 2.31 |
| Flow | 12 | 14 | 14 |
| Sagging | 7 | 7 | 7 |
| Wet abrasion resistance (cycles) | 349 | 742 | 503 |

The neutralized copolymers according to the invention make possible good performance qualities of dispersion of the $TiO_2$ particles as well as very good optical properties and excellent wet abrasion resistance properties for the water-based paint formulations prepared.

The invention claimed is:

1. An aqueous dispersion comprising $TiO_2$ particles and an aqueous solution of a copolymer, wherein the aqueous solution of the copolymer is obtained by a process comprising:
   conducting a polymerization reaction of compound (a) and compound (b) in the presence of water, an initiating compound, and an activating compound, thereby forming a polymerized compound,
   wherein the compound (a) is at least one acid selected from the group consisting of acrylic acid and methacrylic acid;
   the compound (b) is a compound of formula (I):

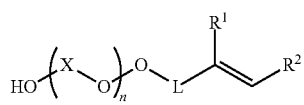

(I)

wherein
   each X independently represents a linear or branched $C_3$-alkylene group;
   n represents a whole or decimal number ranging from 1 to 5;
   L represents a direct bond or a $CH_2$ group;
   $R^1$ represents H, $CH_3$ or C(O)OH; and
   $R^2$ represents H or C(O)OH;
the initiating compound is at least one compound selected from the group consisting of hydrogen peroxide, sodium persulfate, potassium persulfate, and ammonium persulfate and the activating compound comprises an alkali metal hypophosphite; and
neutralizing the polymerized compound completely with at least one compound selected from the group consisting of MgO, CaO, an alkali metal hydroxide, and an alkaline earth metal hydroxide,
wherein the neutralization is carried out after the polymerization reaction,
wherein a weight-average molecular weight ($M_W$) of the copolymer ranges from 1000 to 6000 g/mol.

2. The aqueous dispersion as claimed in claim 1, wherein the compound (a) further comprises at least one other acid selected from the group consisting of itaconic acid and maleic acid.

3. The aqueous dispersion as claimed in claim 1, wherein the polymerization reaction employs from 10% to 90%, by weight of the compound (a), with respect to a total amount by weight of the compounds (a) and (b).

4. The aqueous solution of a copolymer as claimed in claim 1, wherein L represents a direct bond, $R^1$ represents H or $CH_3$, and $R^2$ represents H.

5. The aqueous dispersion as claimed in claim 1, wherein in compound (b):
   each X independently represents a linear or branched $C_3$-alkylene group;
   n represents a whole or decimal number ranging from 1 to 5;
   and when:
   L represents a direct bond, $R^1$ represents H and $R^2$ represents H;
   L represents a direct bond, $R^1$ represents $CH_3$ and $R^2$ represents H;
   L represents a direct bond, $R^1$ represents H and $R^2$ represents C(O)OH; or
   L represents a $CH_2$ group, $R^1$ represents C(O)OH and $R^2$ represents H.

6. The aqueous dispersion as claimed in claim 1, wherein the polymerization reaction employs from 10% to 90%, by weight of the compound (b), with respect to a total amount by weight of the compounds (a) and (b).

7. The aqueous dispersion as claimed in claim 1, wherein a weight-average molecular weight ($M_W$) of the copolymer ranges from 1500 to 4000 g/mol.

8. The aqueous dispersion as claimed in claim 1, wherein the polymerization is performed in water as solvent.

9. An aqueous adhesive composition or an aqueous coating composition, comprising the aqueous dispersion as claimed in claim 1.

10. A water-based paint composition, comprising:
    a film-forming copolymer latex;
    an organic or inorganic pigment; and
    the aqueous dispersion as claimed in claim 1.

11. A process for preparing a copolymer, the process comprising:
    conducting a polymerization reaction of compound (a) and compound (b) in the presence of water, an initiating compound, and an activating compound, thereby forming a polymerized compound,
    wherein the compound (a) is at least one acid selected from the group consisting of acrylic acid and methacrylic acid;
    the compound (b) is a compound of formula (I):

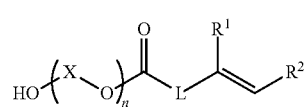

(I)

wherein
   each X independently represents a linear or branched $C_3$-alkylene group;

n represents a whole or decimal number ranging from 1 to 5;
L represents a direct bond or a $CH_2$ group;
$R^1$ represents H, $CH_3$ or C(O)OH; and
$R^2$ represents H or C(O)OH;
the initiating compound is at least one compound selected from the group consisting of hydrogen peroxide, sodium persulfate, potassium persulfate, and ammonium persulfate and the activating compound comprises an alkali metal hypophosphite; and
neutralizing the polymerized compound completely with at least one compound selected from the group consisting of MgO, CaO, an alkali metal hydroxide, and an alkaline earth metal hydroxide,
wherein the neutralization is carried out after the polymerization reaction,
wherein a weight-average molecular weight ($M_W$) of the copolymer ranges from 1000 to 6000 g/mol.

12. The process for preparing a copolymer as claimed in claim 11, wherein L represents a direct bond, $R^1$ represents H or $CH_3$, and $R^2$ represents H.

13. An aqueous solution of a copolymer obtained by a process comprising:
conducting a polymerization reaction of compound (a) and compound (b) in the presence of water, an initiating compound, and an activating compound, thereby forming a polymerized compound,
wherein the compound (a) is at least one acid selected from the group consisting of acrylic acid and methacrylic acid;
the compound (b) is at least one compound selected from the group consisting of formula (II), (III) and (IV):

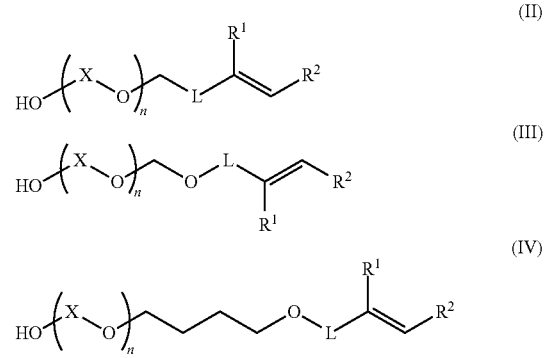

wherein
each X independently represents a linear or branched $C_3$-alkylene group;
n represents a whole or decimal number ranging from 1 to 5;
L represents a direct bond or a $CH_2$ group;
$R^1$ represents H, $CH_3$ or C(O)OH; and
$R^2$ represents H or C(O)OH;
with the proviso that when (b) is a compound of formula (III), the combination X is a linear $C_3$-alkylene group, n is 1, L is a $CH_2$ group, and $R^1$ and $R^2$ are H, is excluded,
the initiating compound is at least one compound selected from the group consisting of hydrogen peroxide, sodium persulfate, potassium persulfate, and ammonium persulfate and the activating compound comprises an alkali metal hypophosphite; and
neutralizing the polymerized compound completely with at least one compound selected from the group consisting of MgO, CaO, an alkali metal hydroxide, and an alkaline earth metal hydroxide,
wherein a weight-average molecular weight ($M_W$) of the copolymer ranges from 1000 to 6000 g/mol.

14. The aqueous solution of a copolymer as claimed in claim 13, wherein compound (b) is a compound of formula (II).

15. The aqueous solution of a copolymer as claimed in claim 13, wherein compound (b) is a compound of formula (III).

16. The aqueous solution of a copolymer as claimed in claim 13, wherein compound (b) is a compound of formula (IV).

17. The aqueous solution of a copolymer as claimed in claim 13, wherein the compound (a) further comprises at least one other acid selected from the group consisting of itaconic acid and maleic acid.

18. The aqueous solution of a copolymer as claimed in claim 13, wherein the polymerization reaction employs from 10% to 90%, by weight of the compound (a), with respect to a total amount by weight of the compounds (a) and (b).

19. The aqueous solution of a copolymer as claimed in claim 13, wherein in compound (b):
each X independently represents a linear or branched $C_3$-alkylene group;
n represents a whole or decimal number ranging from 1 to 5;
and when:
L represents a direct bond, $R^1$ represents H and $R^2$ represents H;
L represents a direct bond, $R^1$ represents $CH_3$ and $R^2$ represents H;
L represents a direct bond, $R^1$ represents H and $R^2$ represents C(O)OH; or
L represents a $CH_2$ group, $R^1$ represents C(O)OH and $R^2$ represents H.

20. The aqueous solution of a copolymer as claimed in claim 13, wherein the polymerization reaction employs from 10% to 90%, by weight of the compound (b), with respect to a total amount by weight of the compounds (a) and (b).

21. The aqueous solution of a copolymer as claimed in claim 13, wherein a weight-average molecular weight ($M_W$) of the copolymer ranges from 1500 to 4000 g/mol.

22. The aqueous solution of a copolymer as claimed in claim 13, wherein L represents a direct bond, $R^1$ represents H or $CH_3$, and $R^2$ represents H.

23. A process for preparing a copolymer, the process comprising:
conducting a polymerization reaction of compound (a) and compound (b) in the presence of water, an initiating compound, and an activating compound, thereby forming a polymerized compound,
wherein the compound (a) is at least one acid selected from the group consisting of acrylic acid and methacrylic acid;
the compound (b) is at least one compound selected from the group consisting of (II), (III) and (IV):

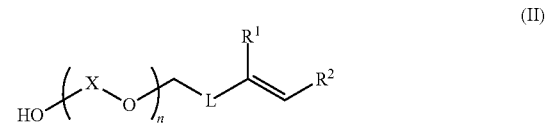

-continued

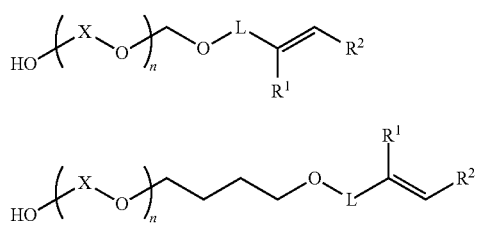

wherein
each X independently represents a linear or branched C$_3$-alkylene group;
n represents a whole or decimal number ranging from 1 to 5;
L represents a direct bond or a CH$_2$ group;
R$^1$ represents H, CH$_3$ or C(O)OH; and
R$^2$ represents H or C(O)OH;
the initiating compound is at least one compound selected from the group consisting of hydrogen peroxide, sodium persulfate, potassium persulfate, and ammonium persulfate and the activating compound comprises an alkali metal hypophosphite; and
neutralizing the polymerized compound completely or partially with at least one compound selected from the group consisting of MgO, CaO, an alkali metal hydroxide, and an alkaline earth metal hydroxide.

24. The process as claimed in claim 23, wherein compound (b) is a compound of formula (II).

25. The process as claimed in claim 23, wherein compound (b) is a compound of formula (III).

26. The process as claimed in claim 23, wherein compound (b) is a compound of formula (IV).

27. The process for preparing a copolymer as claimed in claim 23, wherein L represents a direct bond, R$^1$ represents H or CH$_3$, and R$^2$ represents H.

28. The process for preparing a copolymer as claimed in claim 23, wherein when (b) is a compound of formula (III), the combination X is a linear C$_3$-alkylene group, n is 1, L is a CH$_2$ group, and R$^1$ and R$^2$ are H, is excluded.

29. An aqueous solution of a copolymer obtained by a process comprising:
conducting a polymerization reaction of compound (a) and compound (b) in the presence of water, an initiating compound, and an activating compound, thereby forming a polymerized compound,
wherein the compound (a) is at least one acid selected from the group consisting of acrylic acid and methacrylic acid;
wherein the compound (a) further comprises at least one other acid selected from the group consisting of itaconic acid and maleic acid;
the compound (b) is a compound of formula (I):

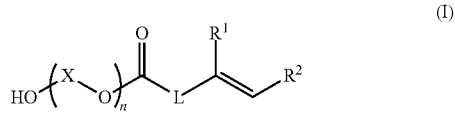

wherein
each X independently represents a linear or branched C$_3$-alkylene group;
n represents a whole or decimal number ranging from 1 to 5;
L represents a direct bond or a CH$_2$ group;
R$^1$ represents H, CH$_3$ or C(O)OH; and
R$^2$ represents H or C(O)OH;
the initiating compound is at least one compound selected from the group consisting of hydrogen peroxide, sodium persulfate, potassium persulfate, and ammonium persulfate and the activating compound comprises an alkali metal hypophosphite; and
neutralizing the polymerized compound completely with at least one compound selected from the group consisting of MgO, CaO, an alkali metal hydroxide, and an alkaline earth metal hydroxide,
wherein a weight-average molecular weight (M$_w$) of the copolymer ranges from 1000 to 6000 g/mol.

* * * * *